ADDING AND SUBTRACTING UNIT FOR A DIGITAL COMPUTER

Filed Dec. 10, 1962 5 Sheets-Sheet 1

INVENTOR.
LUCIAN E. KOWALSKI
BY
Christie, Parker & Hale
ATTORNEYS.

ADDING AND SUBTRACTING UNIT FOR A DIGITAL COMPUTER

Filed Dec. 10, 1962 5 Sheets-Sheet 2

ADDING AND SUBTRACTING UNIT FOR A DIGITAL COMPUTER

ADDING AND SUBTRACTING UNIT FOR A DIGITAL COMPUTER

Filed Dec. 10, 1962 5 Sheets-Sheet 4

INVENTOR.
LUCIAN E. KOWALSKI
BY
Christie, Parker & Hale
ATTORNEYS.

| CONTROL SIGNALS | OPERATION OF CONTROL CIRCUIT-58 |
|---|---|
| t1 | READ PROGRAM SYLLABLES INTO R.F. CTR.-46a AND OP REG.-46b. |
| t2 | STORE REPEAT FIELD IN R.F. CTR.-48. |
| t3 | TRANSFER CHS. TO Y & Z REGS 32 & 38 COMPARE & COUNT COUNTERS AT LOW SPEED FORWARD. |
| t4 | COUNT COUNTERS AT HIGH SPEED FORWARD. |
| t5a | TRANSFER CHS. TO Y & Z REGS. 32 & 38. |
| t5b | SET SIGN F.F. Q02FF & CARRY F.F. Cω. |
| t6a | TRANSFER CHS. TO Y & Z REGS. 32 & 38 |
| t6b | ADD OR SUBTRACT, STORE RESULT IN B REG. 34, & COUNT COUNTERS REVERSE. |
| t7 | RESET FLIP FLOPS. |

FIG. 3A

FIG. 4

TRUTH TABLE FOR CONTROL CIRCUIT-58

| Q03FF (Y≠Z) | Q12FF (Y>Z) | Q02FF (SIGNS=) | OPERATOR IN 46b | | REGISTER CONNECTED TO COMP. CIRCUIT | |
|---|---|---|---|---|---|---|
| | | | ADD | SUB. | Z REG.-38 | Y REG.-32 |
| 0 | 0 | 0 | 0 | 1 | 0 | 0 |
| 0 | 0 | 0 | 1 | 0 | 1 * | 0 |
| 0 | 0 | 1 | 0 | 1 | 1 * | 0 |
| 0 | 0 | 1 | 1 | 0 | 0 | 0 |
| 1 | 0 | 0 | 0 | 1 | 0 | 0 |
| 1 | 0 | 0 | 1 | 0 | 0 | 1 * |
| 1 | 0 | 1 | 0 | 1 | 0 | 1 * |
| 1 | 0 | 1 | 1 | 0 | 0 | 0 |
| 1 | 1 | 0 | 0 | 1 | 0 | 0 |
| 1 | 1 | 0 | 1 | 0 | 1 * | 0 |
| 1 | 1 | 1 | 0 | 1 | 1 * | 0 |
| 1 | 1 | 1 | 1 | 0 | 0 | 0 |

* SET Cω FLIP FLOP FOR FIRST ADD

INVENTOR.
LUCIAN E. KOWALSKI
BY
Christie, Parker & Hale
ATTORNEYS.

United States Patent Office 3,278,733

Patented Oct. 11, 1966

3,278,733
ADDING AND SUBTRACTING UNIT FOR A DIGITAL COMPUTER

Lucian E. Kowalski, Detroit, Mich., assignor to Burroughs Corporation, Detroit, Mich., a corporation of Michigan Filed Dec. 10, 1962, Ser. No. 243,251
17 Claims. (Cl. 235—168)

This patent application relates to digital computers and, more particularly, to an adding and subtracting unit for a digital computer.

It is generally known that subtraction may be performed on decimal numbers by performing a ten's complement on one of the numbers and then adding the complemented and uncomplemented numbers together. However, in order to obtain the correct difference in all cases, it is necessary that certain precautions be taken. For example, prior art digital computers are known which process and subtract numbers arranged in digits. Normally, it is not known at the beginning of the subtraction operations which number is the smaller. Therefore, the digits of one of the numbers are arbitrarily complemented one at a time and the complemented and uncomplemented digits are added together. If the smaller number is complemented and added to the larger number, the result is the true difference between the numbers provided the carry-out from the addition of the most significant digits is neglected. However, if the larger number is complemented and added to the smaller number, the resulting number will be in complement form. Therefore, if the larger number is complemented, the result must be complemented, or else the addition must be repeated complementing the smaller number.

A disadvantage of the above prior art method and apparatus for performing subtraction is that it is slow because the process of adding each digit of the two numbers together must be performed twice. The first addition takes place in order to determine if there is a carry-out. If there is a carry-out, the correct (smaller) number is complemented. If no carry-out takes place and the incorrect (larger) number is complemented, addition is repeated complementing the other (smaller) number. If long numbers, having a large number of digits, are being subtracted, the numbers are stored in a memory unit and only part of the numbers are read out for subtraction. Therefore, it is necessary to take computing time for re-reading the digits of the two numbers out of the memory unit whenever the larger number is complemented in order to re-add the numbers. For example, a commercial digital computer embodying the present invention has variable numbers of digits of up to 64 digits within one number and the digits are read out of the memory eight digits at a time. Therefore, it would be necessary, according to the prior art method of performing subtraction, to take the time to perform eight memory accesses twice for reading the numbers from the memory unit for each subtraction whenever the larger number is complemented.

An advantage of the present invention is that the need for adding digits together in order to determine if the correct number is complemented is eliminated, and as a result, the speed with which subtraction is performed is greatly increased. Subtraction is performed by first reading the numbers out of a memory unit, beginning with the most significant digit rather than the least significant digit, and comparing the digits of the two numbers together until an inequality is detected. When an inequality is detected, the number having the smaller digit is the smaller number, and the reading out of the digits of the two numbers is terminated. The digital computer then skips to the beginning of the two numbers and immediately starts reading out the least significant digits of the two numbers. As the numbers are read out of the memory unit, the correct (smaller) number is complemented and added to the other (larger) number.

Briefly, a specific adding and subtracting unit for a digital computer which embodies the present invention comprises: means for storing of characters representing two numbers which are to be subtracted, the characters of each number being arranged in order between a most significant character and a least significant character; means for comparing the characters of the same order of magnitude of the two numbers beginning with the most significant characters, and for providing an indication of the first inequality detected between two characters being compared, and for providing an indication of the smaller one of the two characters and thereby identify the smaller one of the two numbers; means for complementing the characters of the smaller number identified by the comparing means and for complementing a prearranged one of the numbers if the comparing means indicates that no inequality is detected; means for combining the complemented characters of a number with the uncomplemented characters of the other number and for providing a series of characters corresponding to the difference between the two numbers; and means for storing the difference characters until a complete number corresponding to the difference between the two numbers being subtracted is stored.

These and other features of the present invention may more fully be understood with reference to the following description of the figures.

Figures 1, 1A:
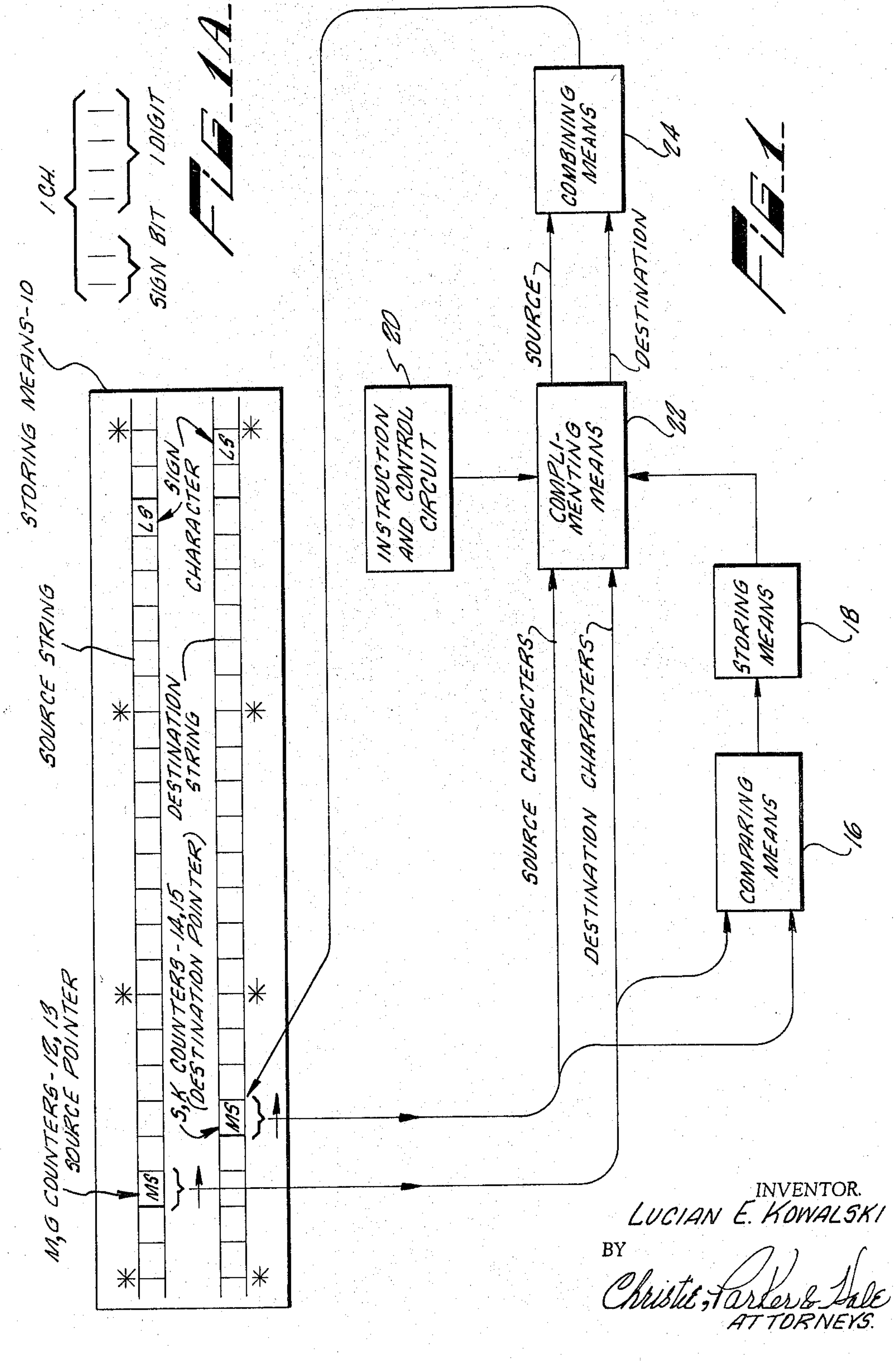
FIG. 1 is a general block diagram and pictorial sketch of an adding and subtracting unit which embodies the present invention.
FIG. 1A is a sketch illustrating the bit structure of the characters stored in the storing means of FIG. 1.
Figures 2, 2A:
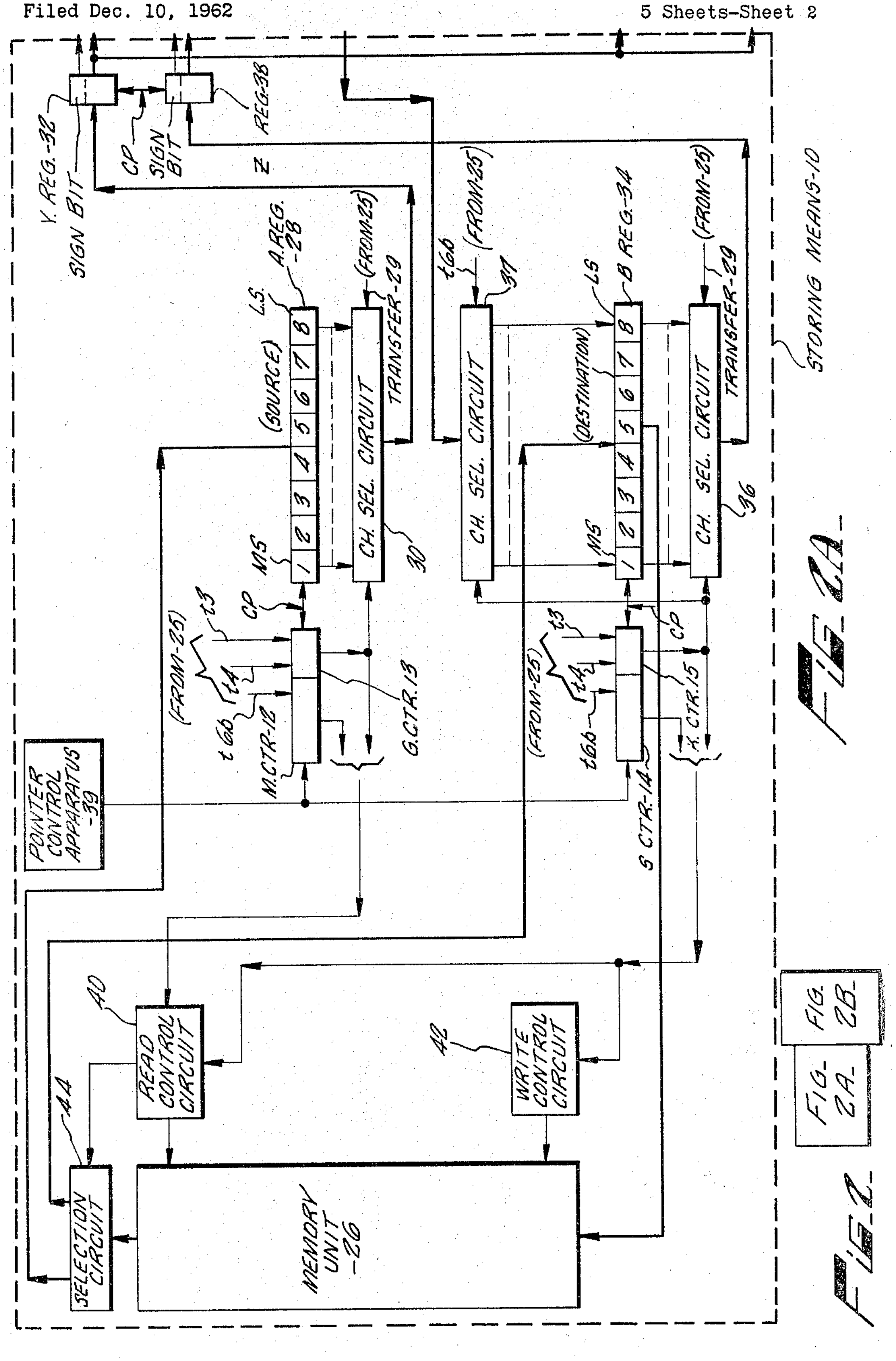
FIG. 2 is a sketch illustrating the positional arrangement of FIGS. 2A and 2B.
Figure 2B:
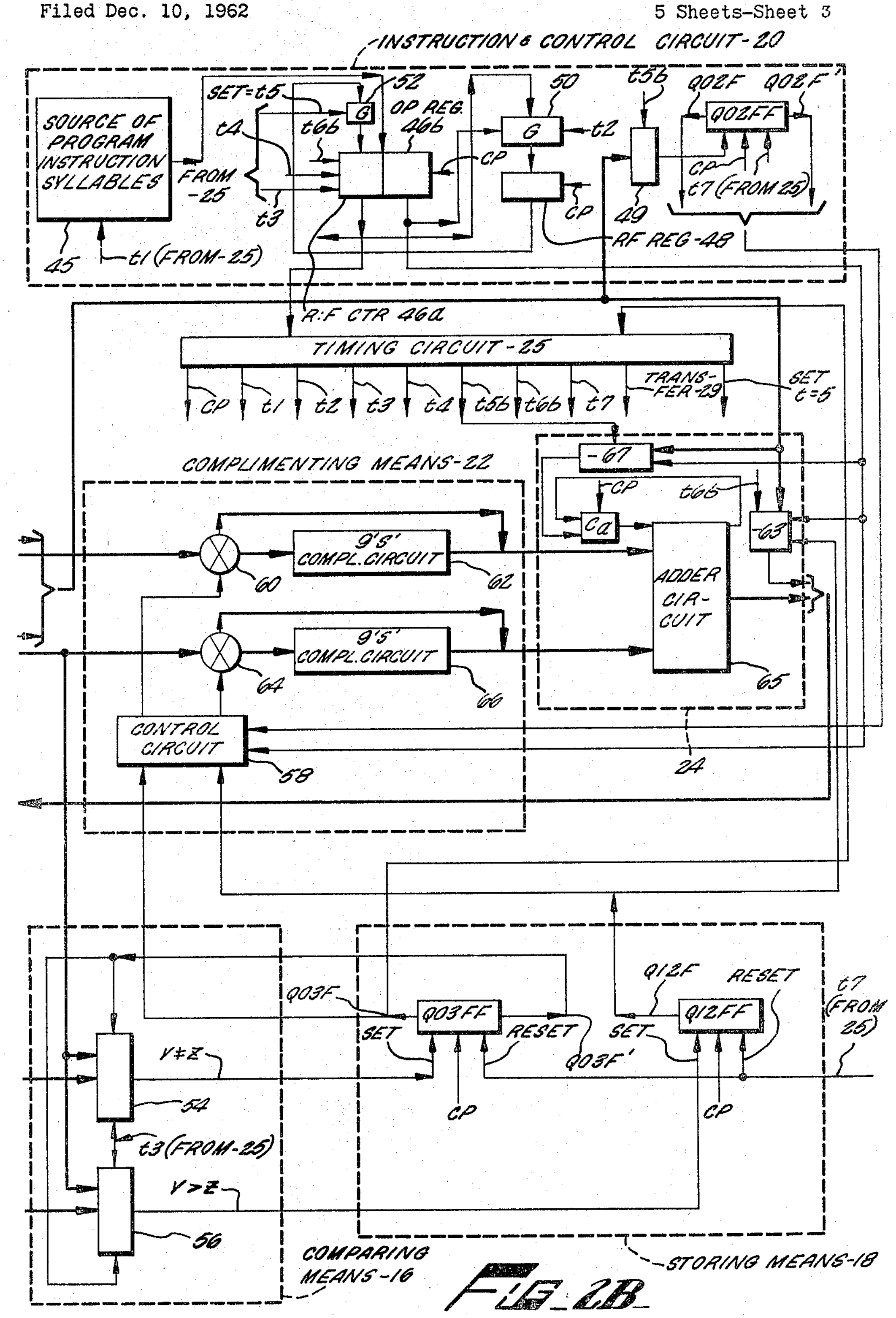
Figure 3:
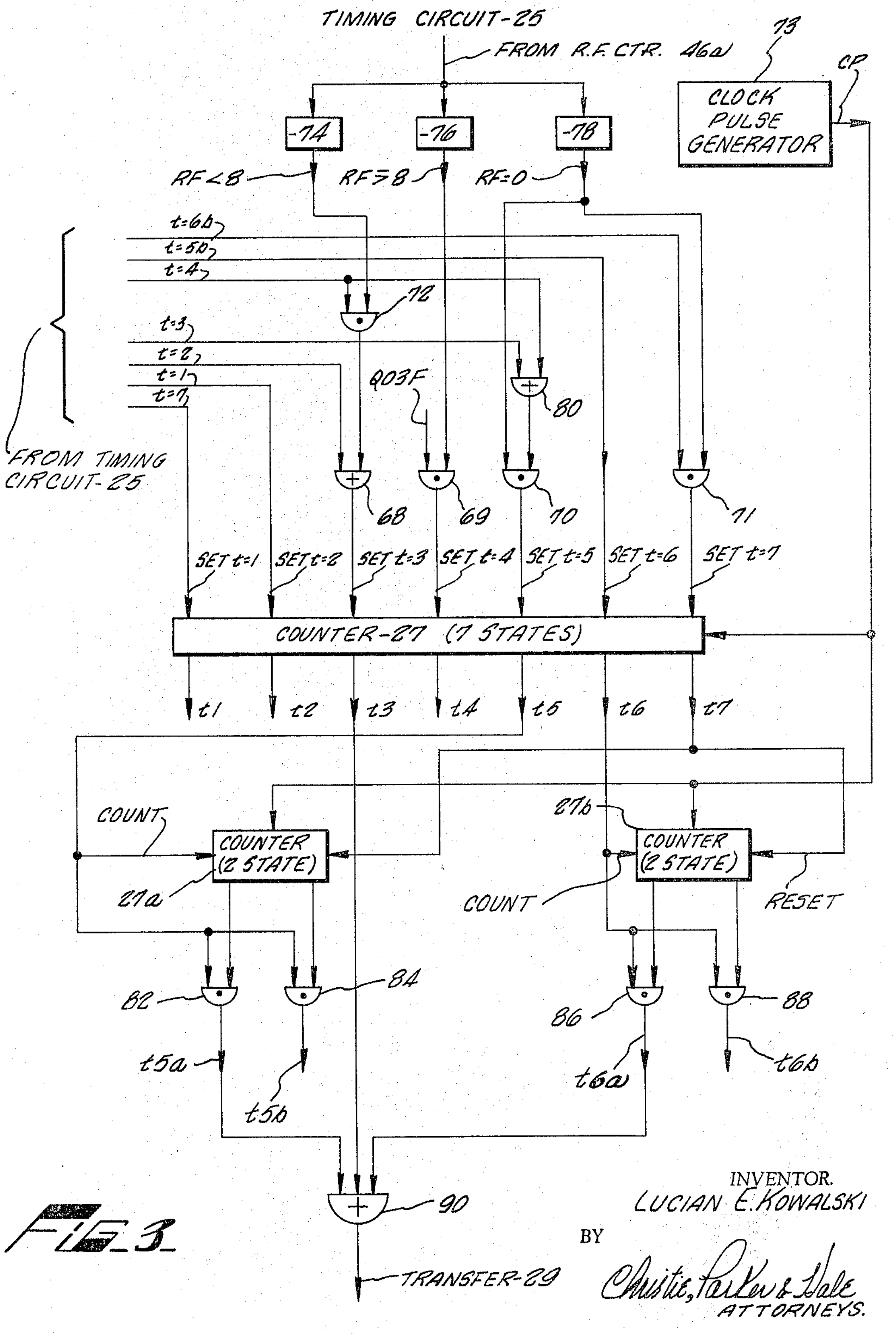

FIGS. 2A and 2B, taken together as shown in FIG. 2, form a detailed block diagram of the adding and subtracting unit of FIG. 1 and embody the present invention;

FIG. 3 is a block diagram of the timing circuits shown in the detailed block diagram of FIG. 2;

FIG. 3A is a table illustrating the operation of the adding and subtracting unit of FIG. 2 during each state of operation of the counter of the timing circuit of FIG. 2; and FIG. 4 is a truth table illustrating the operation of the control circuit shown in the detailed block diagram of FIG. 2.

GENERAL DESCRIPTION

Refer now to the general block diagram of the adding and subtracting unit embodying the present invention which is shown in FIG. 1. A storing means 10 is provided which stores the numbers which are to be subtracted. Each number includes from one up to a maximum of 64 characters. The characters of one number stored in the storing means 10 are also referred to as a field of characters. The characters of the numbers are divided into a source string of characters and a destination string of characters. The characters of each string are arranged one after another in a continuous series of characters in the storing means 10. Each string of information not only contains numbers which are to be subtracted, but includes groups of characters, representing other information, which are to be processed in accordance with a stored program. The string concept and apparatus for operating on strings of information in a digital computer are disclosed in a co-pending patent application entitled "Editing Unit," filed on February 13, 1962, in the name of King, Barton and Bock, bearing Serial No. 173,615, now Patent Number 3,235,848, and assigned to the same assignee as the present invention. The beginning of each word in the storage means of FIG. 1 is represented by asterisks. Only the numbers containing characters to be added and subtracted are described herein.

The characters of each number in the source and destination strings are arranged in order between a most significant character and a least significant character. Two sets of registers referred to as the M register 12 and the G register 13, and the S register 14 and the K register 15 provide an indication of the next character of the source string and of the destination string, respectively, which are to be operated upon by the digital computer. The registers 12 and 13 will be referred to herein as the source string pointer 12 and 13, and the registers 14 and 15 will be referred to herein as the destination string pointer 14 and 15.

Refer to the structure of the character shown in FIG. 1A. Each character contains six bits and is broken down into a digit portion and a zone portion. The digit portion of each character contains 4 bits coded in the binary-coded-decimal 8, 4, 2, 1 code. The zone bits include two bits. The zone bits of only the least significant character of a number are used in the adding and subtracting unit and are used to represent whether the number is positive or negative.

Subtraction and addition are always performed by combining one number in the source string of information with one number in the destination string of information. Whenever either addition or subtraction is to be performed, the characters of the two numbers are first inspected. The inspection begins with the most significant characters of two numbers progressing toward the least significant characters of the numbers. The inspection is made by a comparing means 16 which compares the digits of the characters of the numbers one at a time until an inequality is detected between a digit of the number in the source string and a digit of the number in the destination string. When an inequality is detected, the comparing means 16 provides an output signal indicating that an inequality is detected and an output signal indicating which of the two numbers is the smaller. A storing means 18 stores signals corresponding to the output signals of the comparing means 16 thereby providing a temporary storage of the result of the comparing operation.

The portion of the digital computer containing the instructions which are to be executed is depicted by a box referred to as the instruction and control circuit 20. Also included in the instruction and control circuit 20 (not shown in FIGS. 2A and 2B) are circuits for detecting the signs of the two numbers (contained in the least significant characters of the numbers) which are to be subtracted to determine whether the signs are equal or different.

A complementing means 22 is provided for complementing the digits of the characters of the two numbers together. A combining means 24 is provided for combining the complemented and uncomplemented digits of the two numbers together and for providing characters which include sum or difference digits for storage back into the destination string in the storing means 10.

Refer now to the general operation of the adding and subtracting unit of FIG. 1. Assume that the instruction contained in the instruction and control circuit 20 being executed designates that either an addition or a subtraction is to take place. The source and destination pointers of the storing means 10 were automatically adjusted, following the execution of a previous instruction, and now point at the most significant characters of the numbers to be added or subtracted in the source and destination strings. The source and destination pointers start advancing a character at a time in a forward direction toward the least significant characters of the numbers. As each pair of characters are pointed at, the comparing means 16 compares the two digits contained therein together until an inequality is detected between two digits. When an inequality is detected, the comparing means 16 provides signals to the storing means 18 indicating that an inequality is detected and of which digit is the smaller. The number containing the smaller of the two digits is the smaller number. When an inequality is detected, the pointers are then automatically set such that they point at the least significant characters of the two numbers.

Actually, the characters of the two numbers are read out of the storage means 10 for comparison. Therefore, up to the point where inequality is detected, time must be taken for accessing the storage means 10 and reading the characters out thereof. It should be noted that once inequality is detected between two characters, there is no need for further comparison; therefore, the reading out of the characters is terminated and the memory accesses stopped. The source and destination pointers are then set to the least significant characters of the two numbers, and accesses to the storage means 10 will start taking place again for addition. Another important feature of the adding and subtracting unit is that once inequality is detected and the pointers are being set or adjusted to the least significant characters of the fields, the adjustment of the pointers is made at a faster speed than that used for comparison, thereby saving computing time.

Once the pointers are adjusted and pointing at the least significant characters of the two numbers, the instruction and control circuit 20 detects the signs of the two numbers contained in the least significant characters. If the instruction specifies addition is to take place, and the signs are different or the instruction specifies subtraction is to take place and the signs are the same, signals are provided to the complementing means 22 specifiying that subtraction is to take place. Otherwise, signals are provided to the complementing means 22 indicating addition is to take place.

If addition is to take place, the digits of the characters of the source and destination strings are provided to the combining means 24 in series, one digit of each number at a time beginning with the least significant digit, and the digits of neither one of the numbers are complemented. The combining means 24 then combines the two digits and forms a sum character. If subtraction is to take place, the complementing means 22 complements the smaller of the two numbers which is identified by the stored content of the storing means 18.

Subtraction is performed by taking the 9's complement of each individual digit (of the characters) of the smaller number and adding one decimal digit to the least significant digit to form the 10's complement of the smaller number. This technique for forming the 10's complement is well known and is described at page 241 of the book entitled "Arithmetic Operations in Digital Computers" by R. K. Richards and published by D. Van Nostrand and Company in 1955.

The digits of the number which is in 10's complement form are then added to the digtis of the larger number to form the difference of the numbers. Addition of a decimal number which has been complemented by the 10's complement to another decimal number to form the difference of the numbers is well known in the computer field and is described beginning at page 241 of the above-referenced book entitled "Arithmetic Operations in Digital Computers." During addition or subtraction, the pointers of the storing means 10 advance along in a reverse direction, advancing from the least significant characters toward the most significant characters, pointing at each character of the source and destination numbers which are being combined. The combining means 24 forms result characters containing digits corresponding to the sum or difference of the two numbers and the result characters are stored back into the storing means 10. Each result character formed by the combining means 10 is stored back into the same character position of the destination string as the character of the destination string used to form the result character. Thus, after each of the characters of the two numbers are combined, the result of the addition or subtraction is stored in the destination string in the same storage locations as the original destination number was stored.

It should also be noted that the first result character stored back in the destination string will contain the sign of the sum or difference number. The combining means 24 automatically places a sign in the sign or zone bits portion of the least significant result character.

DETAILED DESCRIPTION

Refer now to the detailed block diagram of the adding and subtracting unit embodying the present invention which is shown in FIGS. 2A and 2B. Each of the flip-flop circuits, registers, and counting circuits of FIGS. 2A and 2B operate in response to a clock pulse. A clock pulse generator 68 (see FIG. 3) is provided in the timing circuit 25 and provides clock pulses at an outut circuit referenced by the symbol CP. Each of the flip-flop circuits, registers, and counting circuits of FIGS. 2A and 2B and FIG. 3 are connected to the CP output circuit of the clock pulse generator 68.

Refer briefly to the schematic diagram of the timing circuit 25 shown in FIG. 3. A timing circuit 25 controls the sequence of operation of the adding and subtracting unit of FIGS. 2A and 2B. A counter 27 in the timing circuit 25 has seven states of operation, referred to as states one through seven, and corresponding thereto seven output circuits referenced by the symbols *t1* through *t7*. Each output circuit receives a control signal at the correspondingly numbered state of the counter 27.

In addition to the counter 27, counters 27A and 27B are provided for forming additional timing signals. The counters 27A and 27B each have two states of operation and together with the connected gating circuits provide timing signals at output circuits referenced by the symbols *t5a*, *t5b*, transfer-29, *t6a*, and *t6b*. Each of the output circuits of the counter 27, and of the counters 27*a* and 27*b* and their connected gating circuits which are connected to other circuits in the adding and subtracting unit of FIGS. 2A and 2B are also shown as output circuits of the timing circuit 25 in FIGS. 2A and 2B. The table of FIG. 3A illustrates the operation of the adding and subtracting unit of FIGS. 2A and 2B in response to control signals applied at the output circuits of the timing circuit 25.

*Storing means 10*

Each number stored in the storing means 10 is actually stored in a memory unit 26 of the storing means 10. The numbers are read and written in the memory unit 26 a group of eight characters at a time. Each group of eight characters is referred to as a word. Each number may include from one up to sixty-four characters; therefore, the characters of a number may be contained in several words stored in the memory unit 26. It should also be understood that the beginning and ending of the words have no correlation with the beginning and ending of the numbers. Thus, the beginning and end of a number may occur anywhere within a word and the number may span several words.

An A register 28, the G counter 13, a character selection circuit 30, and a Y register 32 are provided for converting the words of the source string read out of the memory unit 26 into characters. An A register 34, the K counter 15, a character selection circuit 36, and a Z register 38 are provided for converting the words of the destination string which are read out of the memory unit 26 into characters.

A character selection circuit 37 is provided for storing the result characters formed by the combining means 24 back into the B register 34.

A read control circuit 40 is provided and contains gating and control circuits for causing the content of either the M counter 12 or the S counter 14 to be used for addressing a word in the memory unit 26. A selection circuit 44 is also provided and contains gating for storing words read out of the memory unit 26 into either the A register 28 or the B register 34 depending on control signals provided thereto by the read control circuit 40. Since the result characters are stored back into the B register 34 as they are formed, after each character of the word contained in the B register 34 is combined a complete result word is stored in the B register 34. A write control circuit 42 is provided for causing the content of the S counter 14 to be used for addressing a word storage location of the memory unit 26 for writing the word stored in the B register 34 into the memory unit 26.

The A and B registers are flip-flop registers containing eight groups of six flip-flops for storing the bits of the eight characters of a word.

The Y and Z registers 32 and 38 each contain six flip-flops for storing the characters of the word stored in the A and B registers one digit at a time.

Referring to FIG. 3A, it will be noted that while a control signal is applied at the *t3* output circuit of the timing circuit 25, the comparing means 16 compares the characters in the two numbers to be added or subtracted, and, also, the pointers and other counters of the storing means 10 are to be counted at low speed. While a control signal is applied at the *t4* output circuit, the pointers and other counters are counted at high speed. Also, during the time a control signal is applied at the *t6b* output circuit, the pointers and other counters are counted in a reverse direction.

Referring back to FIGS. 2A and 2B, the G counter 13 is a conventional counter arranged for counting through eight states of operation corresponding to the eight characters of a word stored in the A register 28. Whenever a control signal is applied at the *t3* output circuit of the timing circuit 25, a clock pulse causes the G counter 13 to count in a forward direction. A forward direction is defined herein as a change in state which corresponds to a change in state from that pointing at one character to that pointing at a lower significant character. The M counter 12 is connected to the G counter 13 such that as the G counter 13 counts from a state pointing at the least significant character stored in the A register 28 to a state pointing at the most significant character, the M counter 12 counts in a forward direction from one state to the next in the same direction as the G counter 13. To be explained in the following description of the instruction and control circuit 20, a control signal is applied at the *t4* output circuit of the timing circuit 25 after inequality is detected between the digits of two characters if the state of the M counter 12 is more than one word away from the word containing the least significant character of a field of the source string. The M counter 12 counts forward one word at a time at each clock pulse and the G counter 13 does not count in response to a control signal at the *t4* output circuit. When the state of the M counter 12 is within one word of the word containing the least significant digit of a field, the control signal is removed from the *t4* output circuit and a control signal applied again at the *t3* output circuit causing the G counter 13 to count again one count at a time until it points at the least significant digit of the field to be added or subtracted. When the G counter 13 counts, the counters (or pointers) are said to count at low speed. When the M counter 12 counts and the G counter 13 does not count, the counters (or pointers) are said to count at high speed.

A control signal at the *t6b* output circuit causes the M and G counters 12 and 13 to count in a reverse direction from the above-defined forward direction. The control signal at the *t6b* output circuit causes the G counter to count with each clock pulse and the M counter 12 counts each time the G counter advances from pointing at the most significant character of the word stored in the A register 28 to the least significant character.

The S counter 14 and the K counter 15 and their operation are similar to the M counter 12 and the G counter 13, respectively. Thus, the S and K counters 14 and 15 count at low speed in the forward direction when a control signal is applied at the *t3* output circuit of the timing circuit 25. The S and K counters 14 and 15 count at high speed in the forward direction when a control signal is applied at the *t4* output circuit. Also, the S and K counters 14 and 15 count in a reverse direction while a control signal is applied at the *t6b* output circuit.

To be explained, whenever control signals are applied at the output circuits *t3* and *t5a* (see FIG. 3), control signals are applied at the transfer-29 output circuit. Refer again to FIG. 3A. When control signals are applied at the *t5a* and the *t6a* output circuits, characters are transferred from the A and B registers 28 and 34 and stored in the Y and Z registers 32 and 38.

The G counters 13 and the K counter 15 point at the next characters which are to be stored in the Y and Z registers 32 and 38 for comparison and for addition and subtraction. The character selection circuits 30 and 36 contain gating circuits for storing the character of the words which are stored in the A and B registers 28 and 34 into the Y and Z registers 32 and 38 during a clock pulse whenever a control signal is applied at the transfer-29 output circuit of the timing circuit 25. The character selection circuits 30 and 36 pick the character for storage in the Y and Z registers specified by the state of the G and K counters 13 and 15. Whenever a control signal is applied at the *t6b* output circuit of the timing circuit 25, the character resulting from the combining of two digits is stored back into the B register 34 concurrently with a clock pulse by the character selection circuit 37.

The memory unit 26 is a coincident current type core memory unit and contains decoding circuits, core driving circuits, and sensing circuits (not shown) for reading and writing information a word at a time. The M counter 12 and the S counter 14 are address registers for the memory unit 26. Whether the content of the M counter 12 or the S counter 14 is used for addressing the memory unit 26 for reading information depends on the read control circuit 40. The read control circuit 40 is composed of gating and timing circuits arranged for addressing the circuits of the memory unit 26 with signals corresponding the content of the M counter 12 whenever the G counter 13 is in a state pointing at the least significant character of the word contained in the A register 28 when the M and G counters 12 and 13 are counting in a forward direction and the G counter 13 is ready to count and recycle to the state pointing at the most significant character. In this manner, the A register 28 is refilled with a new word after each of the digits of a word contained therein has been compared.

Similarly, the read control circuit 40 contains gating and control circuits arranged for addressing the circuits of the memory unit 26 and for causing the word to be read out of the memory unit 26, which is identified by the address contained in the M counter 12. The control circuit 40 addresses the memory unit 26 with the address contained in the M counter 12 whenever the G counter 13 is in a state pointing at the most significant character in the word contained in the A register 28 and is counting in a reverse direction about to count from a state pointing at the most significant character to the least significant character. Therefore, similar to the operation during comparison, the A register 28 is automatically refilled with a new word after each character of the word contained in the A register 28 is combined and, in this manner, a continuous flow of characters is made available for combining.

The read control circuit 40 contains gating and timing circuits for automatically addressing the memory unit 26 with the content of the S counter 14 whenever the K counter 15 is counting in a forward direction from the least significant character contained in the B register 34 to the most significant character and when counting in a reverse direction from the most significant character to the least significant character. The operation is identical to that for the M and G counters 12 and 13 and the A register 28.

The write control circuit 42 contains gating circuits arranged for automatically storing the result word stored in the B register 34 after the most significant result character is stored therein. Also, the write control circuit 42 is arranged for addressing and writing the word into the address of the memory unit 26 contained in the S counter 14 when the S and K counters 14 and 15 are counting in a reverse direction preceding, but concurrently with, the counting of the S counter 14 to its next state. In this manner, the complete result word is stored into the same position in the destination string in the memory unit 26 from which the destination word is read for combining.

The memory unit 26 is a conventional coincident current core memory unit similar to that described in chapter seven of the book entitled "Digital Computer Fundamentals" by Thomas C. Bartee, printed by McGraw-Hill Book Company, Inc. in 1960. However, in the arrangement described herein, the read control circuit 40 provides switching so as to allow both the M counter 12 and the S counter 15 to serve as address registers. Other details of the storing means 10 are disclosed in the abovementioned co-pending patent application entitled "Editing Unit."

A pointer control apparatus 39 contains circuits arranged for setting the counters 12, 13, 14, and 15 to an initial state. These circuits are grouped together and illustrated in FIGS. 2A and 2B as the pointer control apparatus 39 for purposes of explanation only. It should be understood that the counters 12, 13, 14, and 15 are adjusted under control of a program stored in the memory unit 26 in an actual model of the invention.

*Instruction and control circuit 20*

Refer now to the instruction and control circuit 20 shown in FIGS. 2A and 2B. A source of program instruction syllables 45 is provided for storing instruction syllables in a repeat field counter 46*a* and an operation register 46*b*. Each instruction syllable consists of two characters. One of the characters is an operation character. The operation character specifies whether add, subtract, etc. is to take place. The operation character is stored in the operation register 46*b*. The other character of the instruction syllable is a repeat field character which specifies the length of the field (or number) to be added or subtracted. Referring to FIG. 3A, it will be noted that the table indicates that a syllable is to be stored into the repeat field register 46*a* and the operation register 46*b* whenever a control signal is applied at the *t1* output circuit. Thus, each time a control signal is applied at the output circuit *t1*, the source of program instruction syllables 45 provides one additional instruction syllable and stores it in the repeat field counter 46*a* and the operation register 46*b*.

Referring again to the table shown in FIG. 3A, it will be noted that the repeat field digit stored in the repeat field counter 46*a* is re-stored in the repeat field register 48 when a control signal is applied at the *t2* output circuit of the timing circuit 25. Referring back to FIGS. 2A and 2B, a gate 50 is provided for storing the repeat field digit stored in the counter 46*a* into the repeat field register 48 whenever an add or a subtract operator digit is stored in the operator register 46*b* and a control signal is applied at the output circuit *t2*.

Whenever the timing circuit 25 applies a control signal at the output circuit *t3*, clock pulses cause the repeat field counter 46*a* to count the repeat field character stored therein down one unit towards zero. State zero is defined as a reference state with respect to the state into which the repeat field counter 46a is set when the repeat field character is stored. It should also be noted that the repeat field counter 46a counts down one state concurrently with each count of the G and K counters 13 and 15.

A control signal at the *t*4 output circuit of the timing circuit 25 causes the repeat field counter 46a to count down eight states at a time skipping over a complete word of characters in the numbers at a time. It will be noted that the counting down of the repeat field counter 46a eight digits at a time corresponds to each count of the M and S counters 12 and 14 while a control signal is applied to the *t*4 output circuit.

After comparison is completed, and the repeat field counter 46a has been counted down to state zero, it is necessary to re-store the repeat field character into the repeat field counter 46a and allow the repeat field counter 46a to re-count down to zero with each count of the G and K counters 13 and 15. When the repeat field counter 46a counts the second time, each of the characters of the source and destination fields are combined. Accordingly, the gate 62 re-stores the repeat field digit stored in the repeat field register 48 into the repeat field counter 46a concurrently with the control signal which sets the counter 27 of the timing circuit 25 into state five. The repeat field counter 46a then counts down one state with every other clock pulse controlled by control signals applied at the output circuit *t6b*.

A control signal is applied at the *t5b* output circuit of the timing circuit 25 when characters of the numbers to be subtracted are stored in the Y and Z registers 32 and 38. Referring again to FIG. 3A, a sign flip-flop Q02FF is set when a control signal is applied at the *t5b* output circuit if the sign bits contained in the least significant characters stored in the Y and Z registers 32 and 38 are unequal. A compare circuit 49 is provided in the instruction and control circuit 20 for comparing the sign bits of the least significant characters stored in the Y and Z registers 32 and 38 when a control signal is applied at the *t5b* output circuit. If the sign bits are equal, the compare circuit 49 applies a control signal at the output circuit thereof. The sign flip-flop Q02FF is triggered into a true state if the signs of the two numbers are unequal. Thus, if the signs of the two numbers are equal, the sign flip-flop Q02FF will be in a true state during the time the two numbers are combined. To be explained subsequently, the state of the sign flip-flop Q02FF provides an indication to the complementing means 22 which is used to determine whether addition or subtraction is to be performed. The sign flip-flop Q02FF has its re-set circuit connected to the *t*7 output circuit of the timing circuit 25 and is re-triggered into a false state in response to a control signal applied thereby.

*Comparing means 16 and storing means 18*

The storing means 18 contains an equality flip-flop Q03FF and a smaller field flip-flop Q12FF. The comparing means 16 contains two comparing circuits 54 and 56.

The re-set inputs of the flip-flops Q03FF and Q12FF are connected to the *t*7 output circuit of the timing circuit 25. A control signal at the *t*7 output circuit causes the Q03FF and Q12FF flip-flop to be re-set into a false state at the end of each adding and subtracting operation.

When control signals are applied at the *t*3 output circuit of the timing circuit 25, characters are being stored in the Y and Z registers 32 and 38 for comparison by the comparing means 16. When a control signal is applied to the *t*3 output circuit and the equality flip-flop Q03FF is in a false state, the comparing circuit 54 applies a control signal to the Q03FF flip-flop causing it to be set into a true state whenever a pair of characters are stored in the Y and Z registers 32 and 38 which are unequal. Also, whenever a control signal is applied at the *t*3 output circuit of the timing circuit 25 and the Q03FF flip-flop is in a false state, the comparing circuit 56 applies a control signal to the smaller field flip-flop Q12FF causing it to be set into a true state if a character is stored in the Y register 32 which is larger than the character stored in the Z register 38.

Therefore, when the comparison operation is complete and the adding and subtracting unit starts combining the two numbers together, the equality flip-flop will contain a stored indication of whether the two numbers are equal and the smaller field flip-flop Q12FF will contain a stored indication of which of the two numbers is the smaller. If the Q03FF flip-flop is in a false state, the two numbers are equal. If the Q03FF flip-flop is in a true state, the two numbers are unequal. The Q12FF flip-flop will be in a true state if the word in the destination string is smaller, and in a false state if the number in the source string is smaller. Additionally, the Q03FF flip-flop provides a control to the comparing circuits 54 and 56 which prevents the circuits from providing additional control signals to the Q03FF and Q12FF flip-flops after the first inequality is detected between two characters.

*Complementing means 22*

Refer now to the complementing means 22 shown in FIGS. 2A and 2B. The complementing means 22 contains a control circuit 58, for controlling switches 60 and 64, and complementing circuits 62 and 66, for complementing the digits of characters stored in the Y and Z registers 32 and 38.

The switch 60 is a conventional electronic switching circuit for coupling the digit bits of the character stored in the Y register 32 directly to the input of the combining means 24 or to the input of the complementing circuit 62 depending on the control signal applied thereto by the control circuit 68. The switch 64 is an electronic switch similar to the switch 60 and is arranged for coupling the digit bits of the character stored in the Z register 38 directly to the combining means 24 or to the input of the complementing circuit 66 depending on the control signals applied thereto by the control circuit 58.

The complementing circuit 62 is a conventional electronic circuit for forming the 9's complement for each digit stored in the Y register 32 whenever the switch 60 couples the Y register 32 to the input circuit thereof. The complementing circuit 66 is identical to the complementing circuit 62. Circuits for forming the 9's complement of digits are well known in the computer art as evidenced by the discussion at pages 241–243 of the above-referenced book entitled "Arithmetic Operations In Digital Computers." Therefore, the details of such a circuit will not be explained herein.

The operation of the control circuit 58 is illustrated by the truth table shown in FIG. 4. The control circuit 58 either connects one of the registers 32 and 38 to the corresponding complementing circuit 62 or 66 or connects neither one of the registers 32 and 38 to the complementing circuits 62 and 66 depending on the input signals applied thereto. The control circuit 58 causes the output signals of one of the registers 32 and 38 to be coupled to the corresponding conplementing circuit 62 and 66 whenever the digits stored in one of the registers are to be complemented.

Referring to the table shown in FIG. 4, a true state of the flip-flops Q03FF, Q12FF, and Q02FF are represented by a symbol 1, whereas the false states thereof are represented by a symbol zero. In the operator column of FIG. 4, a 1 in the add column indicates that the operator stored in the operator register 46b designates addition is to take place. Similarly, a 1 in the subtract column indicates that the operator stored in the operator register 46b specifies subtraction is to take place. At the right-hand two columns of the table of FIG. 4, a 1 is used to designate a digit to be complemented. A 1 in the Z register 38 column indicates that the digits stored in the Z register 38 are to be connected to the complementing circuit 66 by the switch 64 and complemented. Similarly, a 1 in the column for the Y register 32 indicates that the digits stored in the Y register 32 are to be connected to the input of the complementing circuit 62 and complemented thereby.

*Combining means 24*

The combining means 24 contains an adding circuit 65, a sign bit generating circuit 63, a carry flip-flop C*a* and a carry flip-flop control circuit 67.

The adding circuit 65 is a series by digit, parallel by bit, binary-coded-decimal adder similar to that described in Section 6–15 (and in particular shown in FIGS. 6–19) of the above-referenced book entitled "Digital Computer Fundamentals."

The carry flip-flop C*a* is connected to the carry output circuit of the adder circuit 65, similar to that of the one bit delay circuit shown in FIGS. 6–18 of the above-referenced book entitled "Digital Computer Fundamentals." The adder circuit 65 includes gating for triggering the carry flip-flop into a true state whenever a carry-out is formed from the addition of a pair of digits.

The carry flip-flop control circuit 67 contains gating for setting the carry flip-flop C*a*, causing it to apply a carry signal to the adder circuit 65. The carry flip-flop control circuit 67 sets the carry flip-flop C*a* whenever subtraction is to take place depending on the signs of the characters stored in the Y and Z registers 32 and 38 and depending on the type of operator stored in the operator register **46*b*** when a control signal is applied at the *t5b* output circuit. The conditions under which the carry flip-flop C*a* is set so as to apply a control signal to the adder circuit 65 are indicated by asterisks in the two right-hand columns of the table of FIG. 4.

The sign bit generating circuit 63 inserts a positive or negative sign in the sign bits of the least significant result character formed by the combining means 24. The sign bit generating circuit 63 forms the sign signals when a control signal is applied at the *t6b* output circuit and addition of two negative numbers takes place, or two numbers are subtracted and the larger number is negative.

In summary, the operation of the control circuit 58 is as follows: the digits of the source string are complemented by connecting the output of the Y register 32 to the input of the 9's complement circuit 62 whenever the two numbers to be subtracted are not equal (Q03FF flip-flop in a true state) and the number in the source string is the smaller of the two (indicated by a false state of the Q12FF flip-flop) and if subtraction is to take place. Subtraction is defined as taking place if the sign in the least significant or sign character of the numbers are not equal (Q02FF flip-flop is false) and the operator stored in the operator register **46*b* specifies addition is to take place, or the signs are equal (the Q02FF flip-flop is true) and the operator stored in the operator register 46*b*** specifies subtraction is to take place. Similarly, the digits in the destination number are to be subtracted and are complemented if: the two numbers are equal (the Q03FF flip-flop is false) or the destination number is smaller than the source number (the Q12FF flip-flop is true) and subtraction is to take place as defined above.

*Timing circuit 25*

Refer now to the detailed block diagram of the timing circuit 25 shown in FIG. 3. As pointed out hereinabove, the timing circuit 25 includes counters 27, **27*a*, and 27*b*. The counter 27** has seven states of operation and corresponding to the states, seven output circuits represented by symbols *t1* through *t7*. The counter 27 is set into each of its seven states of operation by control circuits which are referenced by the symbols set=*t1* through set=*t7*. The counter 27 is set into the state of operation corresponding to the number symbol representing the set input circuits at the occurrence of clock pulses.

The set=*t1* and set=*t2* input circuits of the counter 27 are connected to the *t7* and *t1* output circuits of the counter 27. The set=*t3* through set=*t5* and set=*t7* input circuits of the counter 27 are connected to the output of gating circuits 68 through 71, respectively. The gate 68 is an "or" type gating circuit and has its input circuits connected to the output of an "and" gating circuit 72 and the output circuit *t2* of the counter 27. The "and" gating circuit 72 has its input circuits connected to the output of a gating circuit 74 and the output circuit *t4* of the counter 27. The gating circuit 74 is connected to the output of the repeat field counter **46*a*** and forms a control signal at the output circuit thereof whenever the content of the repeat field counter is less than 8.

The gate 69 is an "and" type gating circuit. The "and" gating circuit 69 has its input circuits connected to the output circuit Q03F (see FIGS. 2A and 2B) and the output circuit of a gating circuit 76. The gating circuit 76, similar to the gating circuit 74, is connected to the output circuit of the repeat field counter **46*a*. The gating circuit 76 forms a control signal at the output circuit thereof whenever the content of the repeat field counter 46*a*** is 8 or greater.

The gating circuit 70 is an "and" type gating circuit and has its input circuits connected to the output circuits of a gating circuit 78 and a gating circuit 80. The gating circuit 78 has its input circuit connected to the output of the repeat field counter **46*a*, similar to the gates 74 and 76, but forms a control signal at the output circuit thereof whenever the repeat field counter 46*a* is in state zero. The gating circuit 80** is an "or" type gating circuit and has its input circuits connected to the output circuits *t3* and *t4* of the counter 27. The gating circuit 71 is an "and" type gating circuit and has its input circuits connected to the output circuits *t6b* of the counter **27*b* and the output circuit of the gating circuit 78**.

The set *t*=6 input of the counter 27 is connected to the *t*=*5b* output circuit. The counter **27*a* is a two state counter having its output circuits connected to "and" type gating circuits 82 and 84. The count input of the counter 27*a*** is connected to the *t5* output of the counter 27. The gates 82 and 84 also have inputs connected to the *t5* output circuit of the counter 27.

The counter **27*b* is a two state counter having two output circuits connected to "and" type gating circuits 86 and 88. The counter 27*b*** has its count control input connected to the *t6* output circuit of the counter 27. The output circuits of the gating circuits 82, 84, 86, and 88 are referenced by the symbols *t5a*, *t5b*, *t6a* and *t6b*. The counters **27*a* and 27*b*** have re-set control circuits connected to the *t7* output circuit of the counter 27.

An "or" type gating circuit 90 is provided for applying control signals on the transfer line 29. The gating circuit 90 has its input circuits connected to the output circuits *t5a*, *t3*, and *t6b*.

Refer now to the operation of the timing circuit 25. A control signal at the output circuit *t7* causes the counter 27 to be set into state one at the following clock pulse. Similarly, the counter 27 will be set into state two at the following clock pulse whenever a control signal is applied at the *t1* output circuit thereof.

The counter 27 is set into state three from either state two or state four. The counter 27 is set into state three in response to a control signal at the *t2* output circuit of the counter 27. The counter 27 is set into state three in response to a control signal at the *t4* output circuit and a control signal at the output circuit of the gating circuit 74. Referring to FIG. 3A, it has been noted that the counter will be set into state four, causing the pointers to be adjusted at high speed until the pointers are within eight digits of the least significant characters of the fields to be subtracted. Once the pointers are within eight characters of the least significant characters, the counter 27 is re-set into state three where the pointers are adjusted at low speed. The gating circuits 74 and 72 provide the signal to the counter 27 for setting it into state three from state four.

The counter 27 is set into state four whenever the pointers are to be adjusted at high speed. Accordingly, the gate 69 applies a control signal for setting the counter 27 into state four when the characters of two fields are unequal and a control signal is applied at the Q03F output circuit and the content of the repeat field counter 46*a* is equal to or greater than eight.

The counter 27 is set into state five from either states three or four. The gate 70 applies a control signal causing the counter 27 to be set into state five whenever the gating circuit 78 provides a control signal indicating that the content of the repeat field counter 46*a* is zero and control signals are applied at either of the output circuits *t*3 or *t*4.

Initially, the counters 27*a* and 27*b* are in an initial state applying a control signal at the input of the gating circuits 82 and 84. The control signal at the *t*5 output circuit of the counter 27 causes a control signal at the output of the gate *t5a*. The following clock pulse with a control signal at the *t*5 output circuit causes the counter 27*a* to count into its record state wherein it applies a control signal to the gate 84. This causes a control signal at the *t5b* output circuit. Referring to FIG. 3A, it will be noted that there is a one clock period delay between the control signal at *t5a* and *t5b*; hence, a one clock time delay between the transfer of characters to the Y and Z registers 32 and 38 and the time the signs of the characters stored in the Y and Z registers 32 and 38 are compared, the sign flip-flop Q02FF is set and the carry flip-flop C*a* is set. Also, the control signal at the *t5b* output circuit causes a control signal at the set $t=6$ input circuit and the counter 27 is set into state six.

The counter 27*b* counts in response to a control signal at the *t*6 output circuit similar to the counter 27*a*. Also, the counter 27*b* applies control signals to the gating circuits 86 and 88 causing the gate 86 to apply a control signal to the *t6a* output circuit followed by a control signal at the *t6b* output circuit. The counter 27*b* continues to count back and forth between its two states at clock pulses until the counter 27 is set into state seven.

When the repeat field counter 46*a* is counted down to zero, the gating circuit 78 applies a control signal to the gate 71 and when the counter 27*b* is in a state applying a control signal to the gating circuit 88, the signal at the *t6b* output circuit causes the counter 27 to be set into state seven.

Although a specific example of the invention has been described, it should be understood that there are many variations of adding and subtracting units which may be devised within the scope of the present invention. For example, the present embodiment is disclosed wherein strings of contiguous digits are stored in a memory unit and read out for addition and subtraction. However, non-contiguous digits may be added and subtracted with minor modification of the adding and subtracting unit circuitry. Also, other arrangements for providing digits to be added and subtracted may be devised for the circuitry of the storing means 10.

What is claimed is:

1. An adding and subtracting unit for a digital computer comprising:

(a) means for storing digits representing two numbers which are to be subtracted, the digits of each number being arranged in order between a most significant digit and a least significant digit;

(b) means for comparing the digits of the same order of magnitude of the two numbers beginning with the most significant digits and for providing an indication of the first unequal digits being compared and of the smaller one of the two digits and thereby identify the smaller one of the two numbers;

(c) means for complementing the digits of the smaller number identified by the comparing means; and (d) means for combining the complemented digits of a number with the uncomplemented digits of the other number and for providing a series of digits representative of the true difference between the two numbers.

2. An adding and subtracting unit for a digital computer comprising:

(a) means for storing digits representing two numbers which are to be subtracted, the digits of each number being arranged in order between a most significant digit and a least significant digit;

(b) means for comparing the digits of the same order of magnitude of the two numbers beginning with the most significant digits and for providing an indication of the first unequal digits being compared and of the smaller one of the two digits and thereby identify the smaller one of the two numbers;

(c) means for complementing the digits of the smaller number identified by said indication of the comparing means and for complementing a prearranged one of the numbers if the comparing means indicates that no inequality is detected;

(d) means for combining the complemented digits of a number with the uncomplemented digits of the other number and for providing a series of digits representative of the true difference between the two numbers; and (e) means for storing the difference digits until a complete number representative of the difference between the two numbers being subtracted is stored.

3. An adding and subtracting unit for a digital computer comprising:

(a) storage means for storing and providing a series of output digits representing two numbers which are to be subtracted, said storage means being arranged for first providing the digits beginning with the most significant digits of the two numbers and for subsequently providing the digits of the same two numbers beginning with the least significant digits thereof and characterized as providing a digit of one number concurrently with the digit of the same order of magnitude of the other number;

(b) means for comparing the digits of the two numbers as they are first provided by the storage means beginning with the most significant digit and for providing an indication of the first inequality detected between two digits and for providing an indication of the smaller one of the two digits and thereby identify the smaller one of the two numbers;

(c) means for complementing the series of digits of the number provided by the storage means the second time which is identified by indication of the comparing means as the smaller number and for complementing a prearranged one of the numbers if the comparing means indicates that all digits of the two numbers are equal;

(d) means for combining the complemented digits with the uncomplemented digits of the other number provided by the storage means and for providing a series of output digits corresponding to the true difference between the two numbers; and (e) means for storing the difference digits in the order in which they are formed by the combining means until a complete number corresponding to the difference between the two numbers is stored.

4. An adding and subtracting unit as defined in claim 3 wherein the digits are binary-coded-decimal digits and the complementing means is arranged for forming the nine's complement of each individual digit of the smaller number, and the combining means being arranged for combining one decimal unit with the least significant digits of the two numbers for effectively forming a ten's complement of the smaller number and thereby cause a number equal to the true difference of the two numbers to be formed by the combining means.

5. An adding and subtracting unit for a digital computer the combination comprising:

(a) memory means for storing numbers composed of digits which are to be subtracted;

(b) read means for reading out of the memory means digits of two separate numbers for subtraction, said read means being arranged for first reading and making the digits available a digit of the same order of magnitude of each number beginning with the most significant digits of the numbers and then selectively making the digits available a digit of the same order of magnitude of each number beginning with the least signfiicant digits of the numbers;

(c) means for comparing the digits of the two numbers as they are first made available by the read means beginning with the most significant digits and for providing a signal indicative of the first unequal digits compared and of the smaller digit compared, said comparing means including, (1) storage means for storing a signal identifying the smaller number in response to the signal provided by the comparing means and for storing a signal indicating the two numbers are equal if the comparing means fails to detect unequal digits;

(d) means for complementing each digit of the smaller number made available by the read means which is identified by the content of the storing storage means when the numbers are made available beginning with the least significant digits said complementing means further being arranged for complementing the digits of a pre-arranged one of the numbers if the content of the storage means indicates that the comparing means has detected two equal numbers;

(e) means for selectively combining the complemented digits with and digits of the other number made available by the read means and for providing a series of output digits indicative of the true difference between the two original numbers for subtraction; and (f) means for writing the difference digits into the memory means until each of the digits of the two numbers are combined and a complete number corresponding to the difference between the two numbers is stored in the memory means.

6. An adding and subtracting unit for a digital computer the combination comprising:

(a) memory means for storing numbers composed of digits which are to be subtracted;

(b) read means for reading out of the memory means digits of two numbers to be subtracted, said read means being arranged for first providing output digits of the numbers read from the memory means, a digit of the same order of magnitude of each number at a time beginning with the most significant digits and then providing output digits of the numbers read from the memory means a digit of the same order of magnitude of each number at a time beginning with the least significant digits;

(c) means for selectively comparing the output digits which are first provided by the read means beginning with the most significant digit and for providing a signal indicative of the first unequal digits compared and of the smaller digit compared, said comparing means including, (1) first storage means for storing a signal indicating inequality of the two numbers in response to the signal provided by the comparing means and (2) second storage means for storing a signal identifying the smaller number in response to the signal provided by the comparing means, and for storing a predetermined signal if each of the digits of the two numbers are equal;

(d) means for complementing each digit of the smaller number identified by the content of the second storage means when the digits are provided by the read means beginning with the least significant digits, said complementing means further being arranged for complementing the digits of a pre-arranged one of the numbers if the content of the first storage means indicates that the two numbers are equal;

(e) combining means for selectively combining the complemented digits with the digits of the other number provided by the read means and for providing output digits indicative of the true difference between the two original numbers read out of the memory means for subtraction; and (f) means for writing the difference digits into the memory means until each of the digits of the numbers are combined and a complete number corresponding to the difference between the two numbers is stored in the memory means.

7. An adding and subtracting unit for a digital computer the combination comprising:

(a) memory means for storing fields of numbers composed of digits to be added and subtracted;

(b) register means for storing a digit of each of two numbers read out of the memory means for subtraction;

(c) means for reading out of the memory means digits of two numbers for subtraction and for providing digits of the same order of magnitude of each of the two numbers to the register means for storage a digit at a time in series beginning with the most significant digits;

(d) means for comparing the digits stored in the register means and for providing a signal indicative of the first inequality detected between two digits and for providing a signal indicative of the smaller digit and thereby identify the smaller number of the two numbers, said comparing means including, (1) first bistable means for storing a signal indicating the two numbers being compared are unequal in response to an inequality signal provided by the comparing means and (2) second bistable means for storing a signal identifying the smaller number in response to a smaller digit signal provided by the comparing means and for storing a predetermined signal if each of the digits of the two numbers are equal;

(e) means for re-reading out of the memory means digits of the same order of magnitude of the same two numbers for storage in the register means a digit of each number at a time beginning with the least significant digits;

(f) means for selectively complementing each digit of the smaller number stored in the digit storing registers identified by the content of the second bistable means if the content of the first bistable means indicates the two numbers are unequal; and (g) adding circuit means for combining the complemented digit with the digits of the other number stored in the register means and for forming output digits representative of the true difference between the two numbers read out of the memory means for subtraction.

8. An adding and subtracting unit for a digital computer the combination comprising:

(a) memory means for storing fields of numbers composed of digits to be added and subtracted;

(b) register means for storing a digit of each of two numbers read out of the memory means for subtraction;

(c) means for reading out of the memory means digits of two numbers for subtraction and for providing digits of the same order of magnitude of each of the two numbers to the register means for storage a digit at a time in series beginning with the most significant digits;

(d) means for comparing the digits stored in the register means and for providing a signal indicative of the first inequality detected between two digits and for concurrently providing a signal indicative of the smaller digit and thereby identify the smaller number of the two numbers, said comparing means including, (1) first bistable means for storing a signal indicating the two numbers being compared are unequal in response to an inequality signal provided by the comparing means and (2) second bistable means for storing a signal identifying the smaller number in response to a smaller digit signal provided by the comparing means and for storing a predetermined signal if each of the digits of the two numbers are equal;

(e) means for re-reading out of the memory means digits of the same order of magnitude of the same two numbers for storage in the register means a digit of each number at a time beginning with the least significant digits;

(f) means for selectively complementing each digit of the smaller number stored in the digit storing registers identified by the content of the second bistable means if the content of the first bistable means indicates the two numbers are unequal and for selectively complementing the digits of a prearranged one of the numbers if the content of the first bistable means indicates that the two numbers are equal;

(g) adding circuit means for combining the complemented digits with the digits of the other number stored in the register means and for providing output digits representative of the true difference between the two numbers read out of the memory means for subtraction; and (h) means for writing the difference digits into the memory means until each of the digits of the two numbers are combined and a complete number equal to the difference between the two numbers is stored in the memory means.

9. An adding and subtracting unit as defined in claim 7 wherein the digits stored in the memory means are binary-coded-decimal digits, the complementing means including electrical circuit means for forming the nine's complement of each individual digit of the smaller number and the adding circuit means comprises a serial-by-digit and parallel-by-bit adding circuit, including circuit means for combining one decimal unit with the least significant digits of the two numbers, for effectively forming a ten's complement of the smaller number being subtracted and thereby cause a number equal to the true difference of the two numbers being subtracted to be formed by the adding circuit means.

10. An adding and subtracting unit for a digital computer the combination comprising:

(a) memory means for storing fields of digits, each field having digits arranged in order between a most significant digit and a least significant digit and representing a numerical quantity;

(b) a pair of digit storing registers each for storing a digit of a separate one of two digit fields read out of the memory means for subtraction;

(c) means for reading out of the memory means digits of two digit fields to be subtracted and for providing digits of the same order of magnitude of the two digit fields to the respective storing registers for storage a digit at a time in series beginning with the most significant digit of each digit field;

(d) storage means containing a stored indication of the length of a digit field to be subtracted;

(e) repeat field counting means characterized for selectively stepping into a state relative to a reference state corresponding to the length indication contained in the storage means and for selectively counting with each digit provided by the reading means toward said reference state;

(f) means for comparing the digits stored in the two digit storing registers and for providing a signal indicative of the first inequality detected between digits and for providing a signal indicative of the smaller digit and thereby identify the smaller number, said comparing means comprising:

(1) first bistable storing means for storing a signal indicating the two numbers are unequal in response to an inequality signal provided by the comparing means and (2) second bistable means for storing a signal identifying the smaller number in response to a smaller digit signal provided by the comparing means, and for storing a predetermined signal if the repeat field counting means counts to said reference state before inequality is detected thereby indicating that the two digit fields are equal;

(g) means for re-reading out of the memory means digits of the same two digit fields to be subtracted and for providing digits of the same order of magnitude of the two digit fields to the respective digit storing registers for storage a digit at a time in series beginning with the least significant digits, said repeat field counting means further being characterized for selectively re-stepping into the state corresponding to the length indication and counting with each digit re-read out of the memory means toward the reference state thereof;

(h) means for complementing each digit of the smaller digit field stored in the digit storing registers identified by the content of the second bistable means if the content of the first bistable means indicates inequality between the two digit fields and for selectively complementing the digits of a pre-arranged one of the digit fields if the content of the first bistable means indicates that the two digit fields are equal; and (i) adding circuit means for combining the complemented digits with the digits of the other digit field stored in a digit storing register and for forming output digits corresponding to the true difference between the two uncomplemented digit fields.

11. An adding and subtracting unit for a digital computer the combination comprising:

(a) memory means for storing fields of digits, each field having digits arranged in order between a most significant digit and a least significant digit and representing a numerical quantity;

(b) a pair of digit storing registers each for storing a digit of a separate one of two digit fields read out of the memory means for subtraction;

(c) means for reading out of the memory means digits of two digit fields to be subtracted and for providing digits of the same order of magnitude of the two digit fields to the respective storing registers for storage a digit at a time in series beginning with the most significant digit of each digit field;

(d) storage means containing a stored indication of the length of a digit field to be subtracted;

(e) repeat field counting means characterized for selectively stepping into a state relative to a reference state corresponding to the length indication contained in the storage means and for selectively counting with each digit provided by the reading means toward said reference state;

(f) means for comparing the digits stored in the two digit storing registers and for providing a signal indicative of the first inequality detected between digits and for concurrently providing a signal indicative of the smaller digit and thereby identify the smaller number, said comparing means comprising:

(1) first bistable storing means for storing a signal indicating the two numbers are unequal in response to an inequality signal provided by the comparing means and (2) second bistable means for storing a signal identifying the smaller number in response to a smaller digit signal provided by the comparing means, and for storing a predetermined signal if the repeat field counting means counts to said reference state before inequality is detected thereby indicating that the two digit fields are equal;

(g) means for re-reading out of the memory means digits of the same two digit fields to be subtracted and for concurrently providing digits of the same order of magnitude of the two digit fields to the respective digit storing registers for storage a digit at a time in series beginning with the least significant digits, said repeat field counting means further being characterized for selectively re-stepping into the state corresponding to the length indication and counting with each digit re-read out of the memory means toward the reference state thereof;

(h) means for complementing each digit of the smaller digit field stored in the digit storing registers identified by the content of the second bistable means if the content of the first bistable means indicates inequality between the two digit fields and for selectively complementing the digits of a pre-arranged one of the digit fields if the content of the first bistable means indicates that the two digit fields are equal;

(i) adding circuit means for combining the complemented digits with the digits of the other digit field stored in a digit storing register and for providing output digits corresponding to the true difference between the two uncomplemented digit fields; and (j) means for writing the difference digits into the memory means until the repeat field counting means has been recounted into the reference state and each of the digits of the two digit fields have been combined and a complete number corresponding to the difference between the two digit fields is stored in the memory means.

12. An adding and subtracting unit for a digital computer as defined in claim 11 wherein the memory means is arranged for storing words composed of a fixed number of digits, said read means and re-read means comprising means for reading the words out of the memory means containing digits of two digit fields to be subtracted a word at a time, a pair of register means for storing the two words read out of the memory means, said read means additionally comprising a digit counting means for each register means for designating a digit in the corresponding register means which is to be stored in the respective digit storing means, said digit counting means being arranged for counting with each count of the repeat field counting means from the higher order digits of a word stored in the register means toward the lower order digits of the word for providing the digits for storage in the digit storing registers beginning with the most significant digits of the fields and being arranged for counting in the reverse direction with each count of the repeat field counting means for providing the digits of the two digit fields for storage in the digit storing registers beginning with the least significant digits of the fields.

13. An adding and substracting unit for a digital computer the combination comprising:

(a) means for storing a source string of digits and a destination string of digits containing numbers represented by the digits which are to be subtracted;

(b) means for sequentially pointing at the digits of a number in the source string and a number in the destination string to be subtracted in order beginning with the most significant digits and subsequently pointing at each of the digits of the same two numbers in order beginning with the least significant digits thereof;

(c) means for comparing the digits of the two numbers stored in the storing means as they are pointed at by the pointing means beginning with the most significant digits, said comparing means being arranged for providing an indication of the first unequal digits being compared and of the smaller one of the two digits, thereby identifying the smaller one of the two numbers being compared;

(d) means for complementing the digits of the smaller number identified by the comparing means, said complementing means being arranged for complementing the digits as the pointing means points at the digits of two numbers to be subtracted beginning with the least significant digits of the two numbers; and (e) means for combining the complemented digits of a number with the uncomplemented digits of the other number concurrently being pointed at by the pointing means and for providing a series of digits representative of the true difference between the two numbers.

14. An adding and subtracting unit for a digital computer the combination comprising:

(a) means for storing a source string of digits and a destination string of digits containing numbers represented by the digits which are to be subtracted;

(b) means for sequentially pointing at the digits of a number in the source string and a number in the destination string to be subtracted in order beginning with the most significant digits and subsequently pointing at each of the digits of the same two numbers in order beginning with the least significant digits thereof;

(c) means for comparing the digits of the two numbers stored in the storing means as they are pointed at by the pointing means beginning with the most significant digits, said comparing means being arranged for providing an indication of the first unequal digits being compared and of the smaller one of the two digits, thereby identifying the smaller one of the two numbers being compared;

(d) means for complementing the digits of the smaller number identified by the comparing means and for complementing a prearranged one of the numbers if the comparing means indicates that no inequality is detected, said complementing means being arranged for complementing the digits as the pointing means points at the digits of two numbers to be subtracted beginning with the least significant digits of the two numbers;

(e) means for combining the complemented digits of a number with the uncomplemented digits of the other number concurrently being pointed at by the pointing means and for providing a series of digits representative of the true difference between the two numbers; and (f) means for storing the difference digits formed by the combining means until a complete number representative of the difference between the two numbers being subtracted is stored.

15. An adding and subtracting unit for a digital computer as defined in claim 14, wherein the storing means for the difference digits comprises a part of the storing means for the source strings and is arranged for storing the difference digits back into the same position of the destination string as the digits of the destination string used for forming the difference digits.

16. An adding and subtracting unit for a digital computer the combination comprising:

(a) memory means for storing a source string of digits and a destination string of digits containing numbers represented by the digits which are to be subtracted;

(b) means for reading information from the memory means a word of digits at a time;

(c) source and destination register means each for storing a word read out of the memory means from the corresponding strings;

(d) means for sequentially pointing at the digits of a number in the source string and the digits of a number in the destination string stored in the respective register means in order beginning with the most significant digits and subsequently pointing at each of the stored digits of the same two numbers in order beginning with the least significant digits thereof;

(e) means for comparing the digits of the two numbers stored in the storing means as they are pointed at by the pointing means beginning with the most significant digits, said comparing means being arranged for providing an indication of the first unequal digits being compared and of the smaller one of the two digits, thereby identifying the smaller one of the two numbers being compared;

(f) means for complementing the digits of the smaller number identified by the comparing means, said complementing means being arranged for complementing the digits as the pointing means points at the digits of two numbers to be subtracted beginning with the least significant digits of the two numbers;
least significant digits of the two numbers; and (g) means for combining the complemented digits of a number with the uncomplemented digits of the other number concurrently being pointed at by the pointing means and for providing a series of digits representative of the true difference between the two numbers.

17. An adding and subtracting unit for a digital computer the combination comprising:

(a) means for storing a source string of digits and a destination string of digits containing numbers represented by the digits which are to be subtracted;

(b) first means for pointing at a group of digits comprising a word in the source string and in the destination string;

(c) means for reading the words pointed at by said first pointing means;

(d) source and destination register means each for storing a word read out of the memory means from the corresponding strings;

(e) means for sequentially pointing at the digits of a number in the source string and the digits of a number in the destination string stored in the respective register means in order beginning with the most significant digits and subsequently pointing at each of the stored digits of the same two numbers in order beginning with the least significant digits thereof;

(f) means for comparing the digits of the two numbers stored in the storing means as they are pointed at by the pointing means beginning with the most significant digits, said comparing means being arranged for providing an indication of the first unequal digits being compared and of the smaller one of the two digits, thereby identifying the smaller one of the two numbers being compared;

(g) means for complementing the digits of the smaller number identified by the comparing means, said complementing means being arranged for complementing the digits as the pointing means points at the digits of two numbers to be subtracted beginning with the least significant digits of the two numbers; and (h) means for combining the complemented digits of a number with the uncomplemented digits of the other number concurrently being pointed at by the pointing means and for providing a series of digits representative of the true difference between the two numbers.

References Cited by the Examiner

UNITED STATES PATENTS

| | | | |
|---|---|---|---|
| 3,133,190 | 5/1964 | Eckert | 235—159 |
| 3,166,733 | 1/1965 | Schuman | 340—146.2 |

OTHER REFERENCES

IBM Reference Manual 1401 Data Processing System, 1961.

IBM 650 Data Processing System Bulletins, 1958–59.

MALCOLM A. MORRISON, *Primary Examiner.*

ROBERT C. BAILEY, *Examiner.*

T. M. ZIMMER, I. FAIBISCH, *Assistant Examiners.*